US012797889B2

(12) United States Patent
Rundo et al.

(10) Patent No.: US 12,797,889 B2
(45) Date of Patent: Nov. 17, 2026

(54) MODULAR MANIFOLD UNIT

(71) Applicant: Woodster Capital, Ltd., Chardon, OH (US)

(72) Inventors: Mark Rundo, Washington, DC (US); Matthew Christopher Rundo, Washington, DC (US)

(73) Assignee: WOODSTER CAPITAL, LTD., Chardon, OH (US)

( * ) Notice: Subject to any disclaimer, the term of this patent is extended or adjusted under 35 U.S.C. 154(b) by 44 days.

(21) Appl. No.: 18/541,205

(22) Filed: Dec. 15, 2023

(65) Prior Publication Data

US 2025/0196177 A1 Jun. 19, 2025

(51) Int. Cl.
*B05C 5/02* (2006.01)
*F16K 27/00* (2006.01)

(52) U.S. Cl.
CPC .......... *B05C 5/0275* (2013.01); *F16K 27/003* (2013.01); *Y10T 137/87885* (2015.04)

(58) Field of Classification Search
CPC ..................... F15B 13/0817; Y10T 137/87885
See application file for complete search history.

(56) References Cited

U.S. PATENT DOCUMENTS 3,806,088 A * 4/1974 Stoneman ........... F15B 13/0821 137/884
4,726,399 A * 2/1988 Miller ..................... F16L 41/03 285/133.11
5,927,337 A * 7/1999 LaMantia ........... F15B 13/0832 137/884
2009/0095354 A1* 4/2009 Taskar .................... F16L 41/03 137/15.01
2018/0147596 A1* 5/2018 Rundo .................... B05C 21/00

* cited by examiner

*Primary Examiner* — Robert K Arundale
(74) *Attorney, Agent, or Firm* — Chrisman Gallo Tochtrop LLC

(57) ABSTRACT

A manifold unit includes a body that defines a first inlet aperture having a first inlet axis; a second inlet aperture having a second inlet axis substantially coincident with the first inlet axis; a first outlet aperture having a first outlet axis substantially perpendicular to the first and second inlet axes; and a second outlet aperture having a second outlet axis substantially perpendicular to the first and second inlet axes. The second outlet axis is substantially coplanar with the first outlet axis.

15 Claims, 7 Drawing Sheets

MODULAR MANIFOLD UNIT

FIELD OF THE INVENTION

This application generally relates to a modular manifold unit, and more specifically, a modular manifold unit that can be used to form a manifold system of a multi-bead applicator.

BACKGROUND

The present disclosure relates to a modular manifold unit for a multi-bead applicator that can be used to apply adhesive or other fluids along a surface in a plurality of beads. There are a number of circumstances where an apparatus for concurrently applying a plurality of beads of a substance can be advantageously employed. For example, when constructing roofs for commercial or industrial buildings, adhesives are commonly used to secure various layers of roofing materials together. It is highly desirable that an apparatus be available that can rapidly apply large volumes of the adhesive to a relatively wide section of a roof in a single pass of the apparatus over the roofing materials. Thus, it can be desirable to have an applicator that simultaneously applies multiple, spaced apart, beads of adhesive along the roof in a single pass. Moreover, it may be advantageous to have an applicator that applies a two-part adhesive formed by mixing two-adhesive reactants.

One example multi-bead applicator of the prior art is illustrated in FIG. 9 of the present disclosure. The applicator includes first and second manifold systems 302A, 302B, which each include an inlet (not shown) and a plurality of outlets 304A, 304B in communication with the inlet. The applicator further includes a plurality of nozzles 378, wherein each nozzle 378 is fluidly coupled to a pair of associated outlets 304A, 304B via associated fluid lines 308A, 308B. The inlets of the manifold systems 302A, 302B can be fluidly coupled to respective fluid sources, such that a first fluid can be delivered to the nozzles 378 via the first manifold system 302A and the first set of fluid lines 308A, and a second fluid can be delivered to the nozzles 378 via the second manifold system 302B and the second set of fluid lines 308B.

However, the manifold systems 302A, 302B are not customizable for different applications requiring a different number of nozzles 378 and corresponding manifold outlets 304A, 304B. Moreover, due to the configuration and alignment of the manifold systems 302A, 302B and their outlets 304A, 304B, the fluid lines 308A, 308B must cross each other to fluidly couple every nozzle 378 to each manifold system 302A, 302B, leading to a complicated and tangled arrangement of fluid lines 308A, 308B. Furthermore, the fluid line 308A, 308B from one nozzle 378 to a manifold system 302A, 302B may be significantly longer than the fluid line 308A, 308B from the same to nozzle 378 to the other manifold system 302A, 302B (e.g., the fluid line 308B from the far-left nozzle 378 to the second manifold system 302B extends a farther distance than the fluid line 308A from the same nozzle 378 to the first manifold system 302A). This can result in uneven flow of the first and second fluids to the nozzles 378, since the fluids must flow different distances thereto.

SUMMARY OF THE INVENTION

In accordance with a first aspect, a manifold unit includes a body that defines a first inlet aperture having a first inlet axis; a second inlet aperture having a second inlet axis substantially coincident with the first inlet axis; a first outlet aperture having a first outlet axis substantially perpendicular to the first and second inlet axes; and a second outlet aperture having a second outlet axis substantially perpendicular to the first and second inlet axes. The second outlet axis is substantially coplanar with the first outlet axis.

In accordance with a second aspect, manifold system includes a plurality of manifold units, wherein each manifold unit includes a body that defines a first inlet aperture having a first inlet axis; a second inlet aperture having a second inlet axis substantially coincident with the first inlet axis; a first outlet aperture having a first outlet axis substantially perpendicular to the first and second inlet axes; and a second outlet aperture having a second outlet axis substantially perpendicular to the first and second inlet axes. The second outlet axis is substantially coplanar with the first outlet axis.

BRIEF DESCRIPTION OF THE DRAWINGS

These and other features, aspects and advantages of the present disclosure can be further understood when read with reference to the accompanying drawings, wherein.

DETAILED DESCRIPTION

Figure 1:
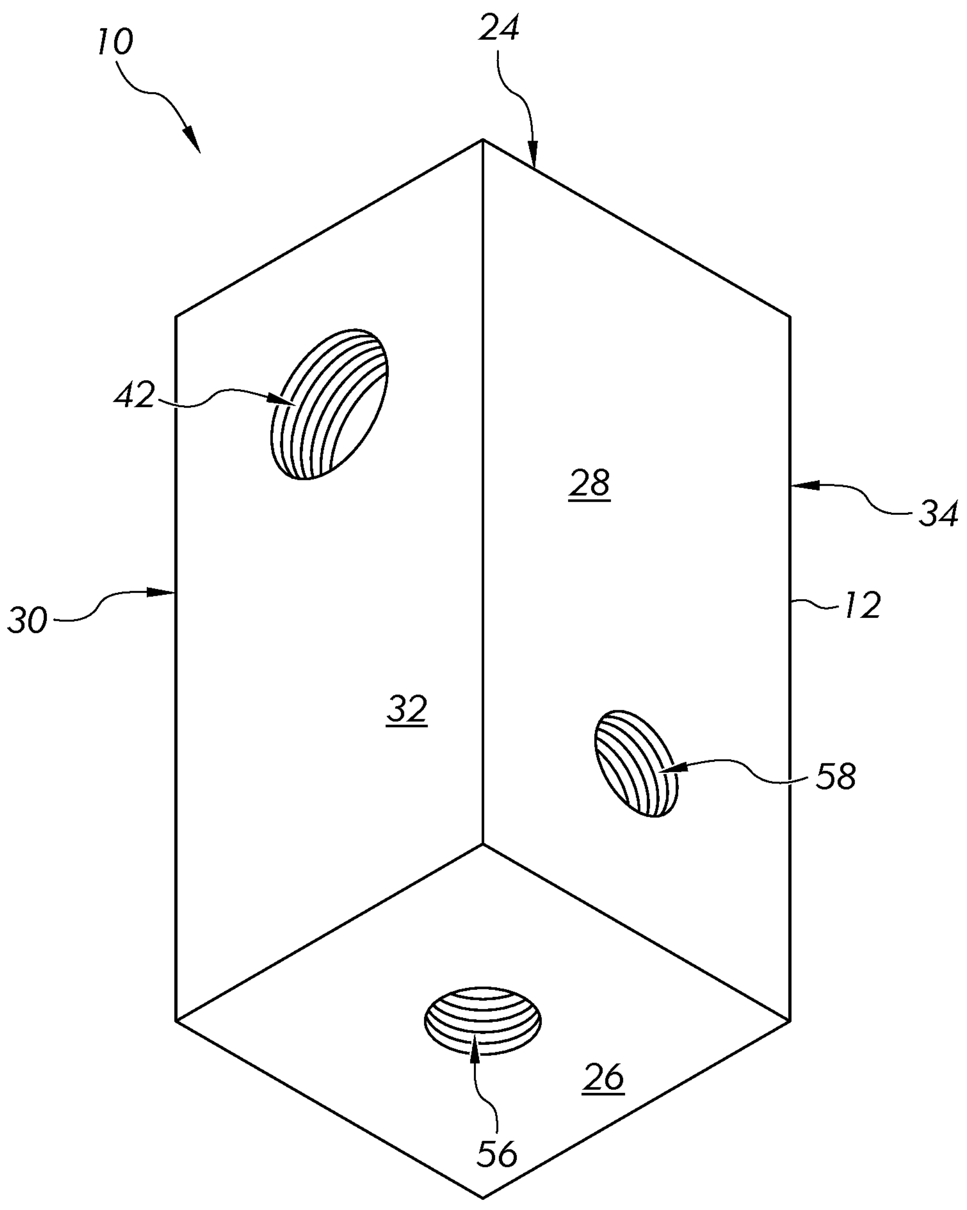
FIG. 1 is a perspective view of an example modular manifold unit.

The following is a detailed description of illustrative embodiments of the present application. As these embodiments of the present application are described with reference to the aforementioned drawings, various modifications or adaptations of the methods and or specific structures described may become apparent to those skilled in the art. All such modifications, adaptations, or variations that rely upon the teachings of the present application, and through which these teachings have advanced the art, are considered to be within the spirit and scope of the present application. Hence, these descriptions and drawings are not to be considered in a limiting sense as it is understood that the present application is in no way limited to the embodiments illustrated.

Moreover, certain terminology is used herein for convenience only and is not to be taken as a limitation. For example, relative directional terms herein such as “front”, “rear”, “top”, “bottom”, “left”, “right”, and the like are used for convenience when describing the embodiments as oriented in the drawings. Such orientation(s), however, are arbitrary, and different orientations can result rearranging which feature might be considered the “left” or “right,” etc.

Furthermore, the term “substantially” is intended to note that the described features are equal or approximately equal to a value or characteristic, as desired, reflecting tolerances, conversion factors, rounding off, measurement error and the like, and other factors. The term is also utilized herein to represent the degree by which a quantitative representation may vary from a stated reference without resulting in a change in the basic function of the subject matter at issue. For example, two features that are "substantially parallel" or "substantially perpendicular" can denote features that are within about 10° of exact, for example within about 5° of exact, or within about 2° of exact. As another example, two features that are "substantially coplanar" or "substantially coincident" can denote features that are similarly angled from exact and/or offset from exact by a nominal distance such as about ⅛ inch or less, for example about 1⁄16 inch or less. As yet another example, two features that are "substantially equidistant" or the like can denote features that are within about 10% of exact, for example within about 5% of exact, or within about 2% of exact. When the term "substantially" is used in describing a value or characteristic, the disclosure should be understood to include the exact value or characteristic being referred to.

Figure 3:
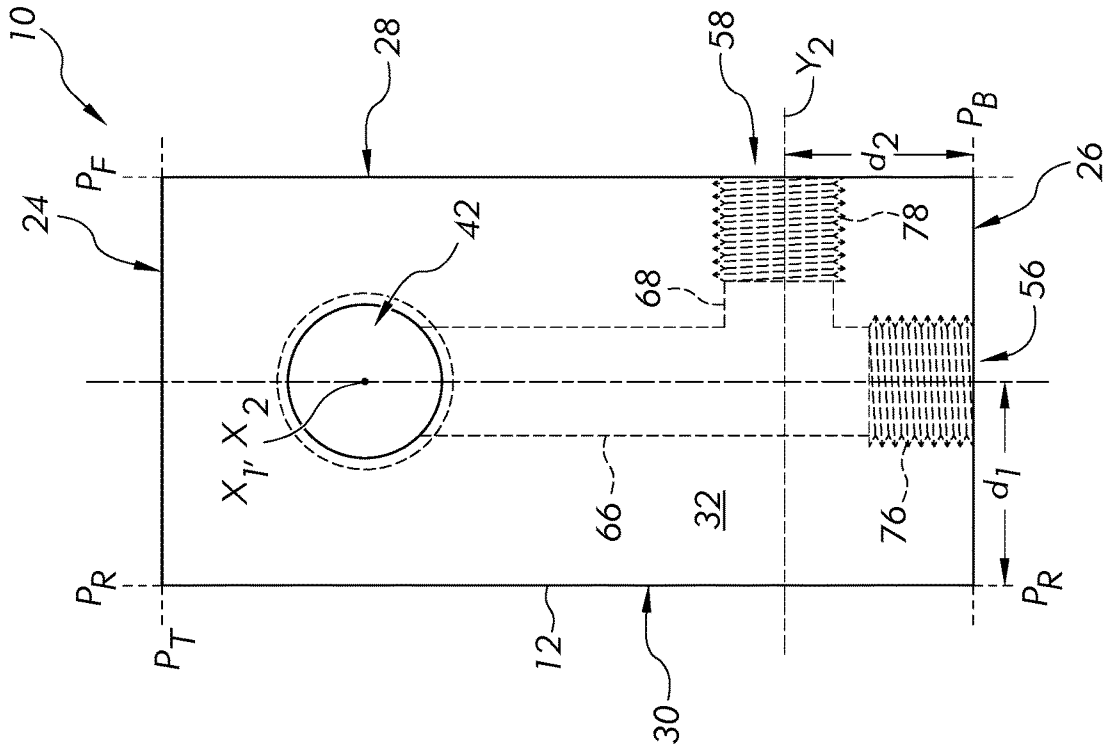
FIG. 3 is a left side view of the manifold unit.
Figure 2:
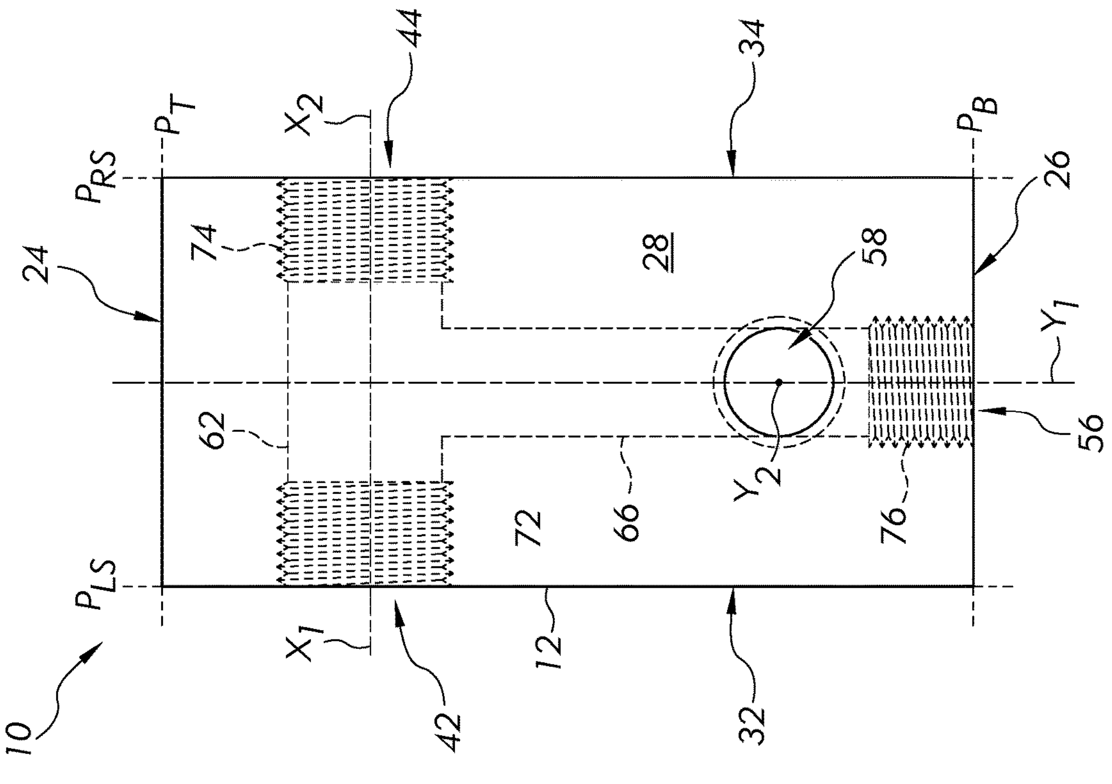
FIG. 2 is a front view of the manifold unit.

Turning to FIGS. 1-3, an example manifold unit 10 will now be described that can form part of a manifold system for a multi-bead applicator. FIG. 1 shows a perspective view of the manifold unit 10, while FIGS. 2 and 3 respectively show front and left side views of the manifold unit 10.

The manifold unit 10 comprises a monolithic body 12 of material (e.g., aluminum, stainless steel, etc.) having a substantially cuboid shape with a top surface 24 that extends along a top plane $P_T$; a bottom surface 26 opposite to the top surface 24 that extends along a bottom plane $P_B$ substantially parallel to the top plane $P_T$; a front surface 28 that extends along a front plane $P_F$; a rear surface 30 opposite to the front surface 28 that extends along a rear plane $P_R$ substantially parallel to the front plane $P_F$; a left-side surface 32 that extends along a left-side plane $P_{LS}$; and a right-side surface 34 opposite to the left-side surface 32 that extends along a right-side plane PRS substantially parallel to the left-side plane $P_{LS}$. The top and bottom planes $P_{T,B}$ are each substantially perpendicular to the other planes $P_{F,R,LS,RS}$. Moreover, the front and rear planes $P_{F,R}$ are each substantially perpendicular to the left- and right-side planes $P_{LS,RS}$.

The left- and right-side surfaces 32, 34 of the body 12 respectively define first and second inlet apertures 42, 44 having first and second inlet axes $X_1$, $X_2$ that are substantially coincident with each other, while the bottom and front surfaces 26, 28 respectively define first and second outlet apertures 56, 58 having first and second outlet axes $Y_1$, $Y_2$ that are substantially coplanar and perpendicular to the first and second inlet axes $X_1$, $X_2$. In particular, the first outlet axis $Y_1$ intersects with the first and second inlet axes $X_1$, $X_2$, while the second outlet axis $Y_2$ intersects with and is substantially perpendicular to the first outlet axis $Y_1$.

The first and second inlet apertures 42, 44 and the first outlet aperture 56 are all substantially centered between the front and rear planes $P_{F,R}$, while the first and second outlet apertures 56, 58 are both substantially centered between the left- and right-side planes $P_{LS,\ RS}$. Put another way, the first and second inlet axes $X_1$, $X_2$ and first outlet axis $Y_1$ are substantially centered between and parallel to the left- and right-side planes $P_{LS,\ RS}$, while the first and second outlet axes $Y_1$, $Y_2$ are substantially centered between and parallel to the left- and right-side planes $P_{LS}$, RS. Moreover, the first outlet axis $Y_1$ of the first outlet aperture 56 is spaced a first distance $d_1$ from the rear plane $P_R$, while the second outlet axis $Y_2$ of the second outlet aperture 58 is spaced a second distance $d_2$ from the bottom plane $P_B$, the first and second distances $d_{1,2}$ being substantially equal to each other.

The body 12 further defines an inlet channel 62 that extends from the first inlet aperture 42 to the second inlet aperture 44, a first outlet channel 66 that extends from the inlet channel 62 to the first outlet aperture 56, and a second outlet channel 68 that extends from the first outlet channel 66 to the second outlet aperture 58. In the present embodiment, the inlet channel 62 extends along and is concentric with the first and second inlet axes $X_1$, $X_2$. Moreover, the first and second outlet channels 66, 68 respectively extend along and are concentric with the first and second outlet axes $Y_1$, $Y_2$. However, the channels 62, 66, 68 may have other arrangements without departing from the scope of the disclosure. In one example, the inlet channel 62 can be a V-shaped channel that connects the first and second inlet apertures 42, 44 with the first outlet channel 66.

The inlet channel 62 in the present example has an internal diameter of ½ inch while the outlet channels 66, 68 have an internal diameter of ⅜ inch. Moreover, each channel 62, 66, 68 is at least partially threaded at a portion adjacent to its associated inlets or outlet. For example, in the present embodiment, the inlet channel 62 has a first set of inlet threads 72 adjacent to the first inlet aperture 42 and a second set of inlet threads 74 adjacent to the second inlet aperture 44. Moreover, the first and second outlet channels 66, 68 respectively have first and second sets of outlet threads 76, 78 adjacent to the first and second outlet apertures 56, 58.

As can be seen in FIGS. 2 and 3, the inlet and first outlet channels 62, 66 are configured such that the flow paths from the first and second inlet apertures 42, 44 to the first outlet channel 66 are substantially equidistant. Likewise, the first and second outlet channels 66, 68 are configured such that the flow paths from the inlet channel 62 to the first and second outlet apertures 56, 58 are substantially equidistant. That is, a first flow path from the inlet channel 62 to the first outlet aperture 56 has substantially the same distance as a second flow path from the inlet channel 62 to the second outlet aperture 58. In this manner, the manifold unit 10 can provide a similar path between either inlet aperture 42, 44 and either outlet aperture 56, 58.

Figure 4:
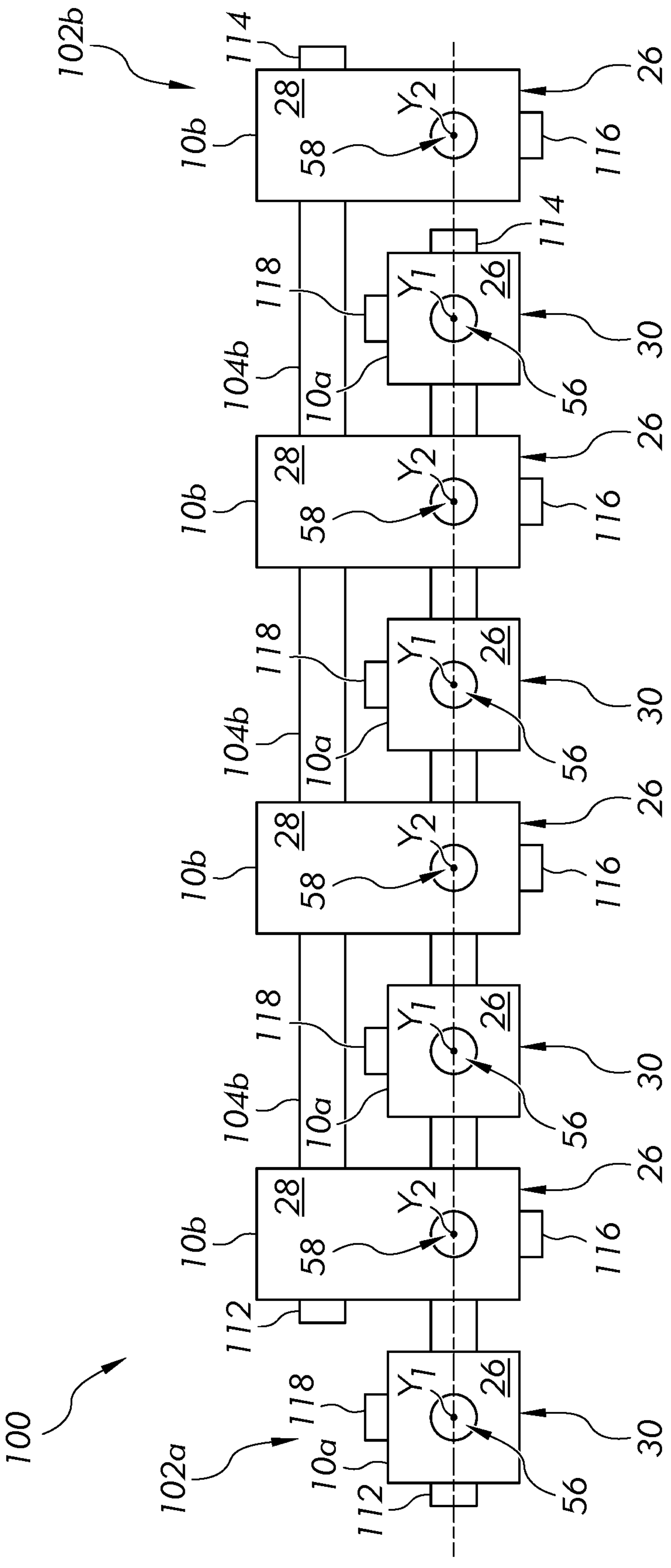
FIG. 4 is a front view of an example manifold system that is assembled using the manifold unit.
Figure 5:
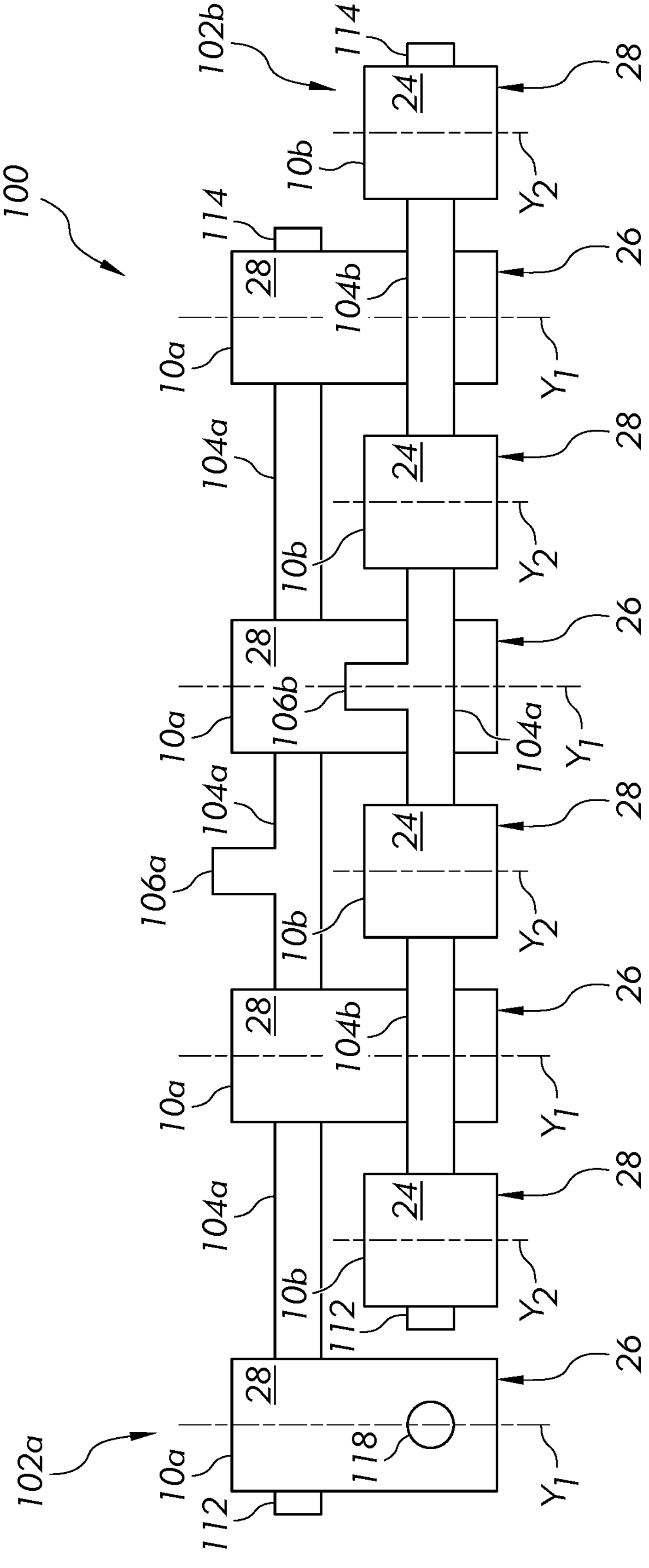
FIG. 5 is a top view of the manifold system.

Turning to FIGS. 4 and 5, and example manifold system 100 will now be described that can be assembled using the manifold unit 10 described above. FIG. 4 shows a front view of the manifold system 100 while FIG. 5 shows a top view of the manifold system 100.

The manifold system 100 has a first sub-system **102*a* comprising a set of first manifold units 10*a*, wherein each manifold unit 10*a* is arranged in a horizontal configuration such that its front and rear surfaces 28, 30 are horizontal. The manifold system 100 further includes a second sub-system 102*b* comprising a set of second manifold units 10*b*, wherein each manifold unit 10*b* is arranged in a vertical configuration such that its front and rear surfaces 28, 30** are vertical.

The manifold units **10*a*, 10*b* of each sub-system 102*a*, 102*b* are aligned and fluidly coupled via a plurality of coupling elements 104*a*, 104*b*. In particular, each pair of fluidly coupled manifold units 10*a*, 10*b* has an associated coupling element 104*a*, 104*b* with one end that is threadably inserted through the first inlet aperture 42 of one manifold unit 10*a*, 10*b*, and another end that is threadably inserted through the second inlet aperture 44 of the other manifold unit 10*a*, 10*b*. Each coupling element 104*a*, 104*b* can be a tube (e.g., pipe, hose, etc.) or some other fluid coupler that can convey fluid between its associated manifold units 10*a*, 10*b*. Moreover, one or more of the coupling elements 104*a*, 104*b* can have an inlet 106*a*, 106*b* for fluidly coupling its associated sub-system 102*a*, 102*b*** to a fluid source.

The manifold units 10*a*, 10*b* of the first and second sub-systems 102*a*, 102*b* are alternately aligned such that the bottom surfaces 26 of the first manifold units 10*a* and the front surfaces 28 of the second manifold units 10*b* are substantially coplanar (see FIG. 5), while the rear surfaces 30 of the first manifold units 10*a* and the bottom surfaces 26 of the second manifold units 10*b* are also substantially coplanar (see FIG. 4). By this configuration, the first outlet apertures 56 of the first manifold units 10*a* and the second outlet apertures 58 of the second manifold units 10*b* will be substantially coplanar. Moreover, because the distances between the rear surfaces 30 and first outlet axes $Y_1$ of the first manifold units 10*a* are substantially similar to the distances between the bottom surfaces 26 and second outlet axes $Y_2$ of the second manifold units 10*b*, the first outlet axes $Y_1$ of the first manifold units 10*a* and the second outlet axes $Y_2$ of the second manifold units 10*b* will be substantially parallel and coplanar.

Each sub-system 102*a*, 102*b* can further include one or more plugs that are threadably inserted into an inlet or outlet aperture 52, 54, 56, 58 of the sub-system. For instance, each sub-system 102*a*, 102*b* in the present embodiment has first and second plugs 112, 114 that are respectively inserted into the first and second inlet apertures 52, 54 of its end manifold units 10*a*, 10*b*. Moreover, the first sub-system 102*a* has a plurality of plugs 118 that are inserted into the second outlet apertures 58 of its manifold units 10*a*, and the second sub-system 102*b* has a plurality of plugs 116 that are inserted into the first outlet apertures 56 of its manifold units 10*b*.

Figure 6:
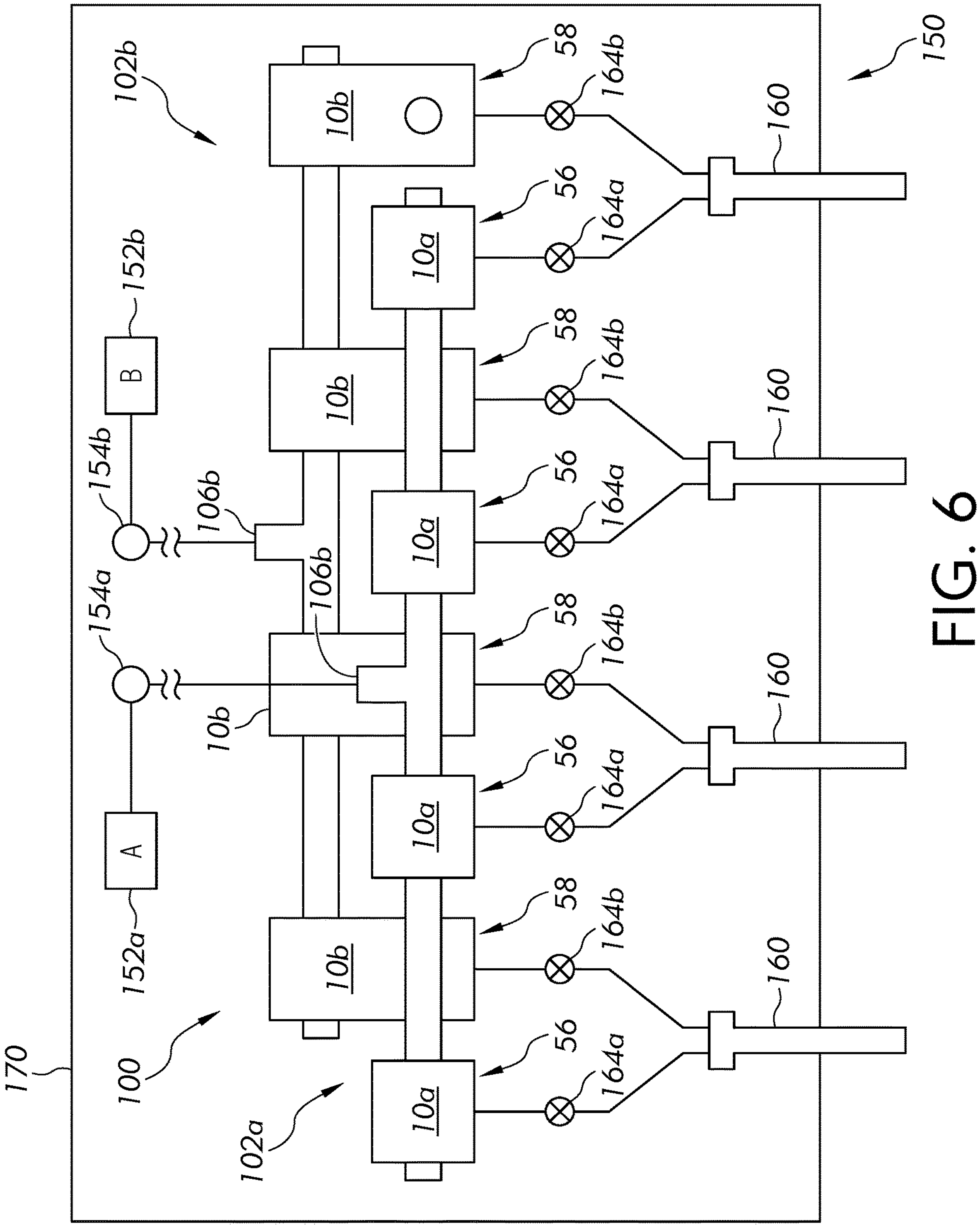
FIG. 6 is a schematic top view of an example multi-bead applicator that includes the manifold system.

As shown schematically in FIG. 6, the manifold system 100 can be fluidly coupled with various other elements to form a multi-bead applicator 150. Specifically, the inlet 106*a* of the first sub-system 102*a* can be fluidly coupled to a first fluid source 152*a* that contains a first fluid A, and the inlet 106*b* of the second sub-system 102*b* can be fluidly coupled to a second fluid source 152*b* that contains a second fluid B. Moreover, a first pump 154*a* can be fluidly coupled between the first fluid source 152*a* and first inlet 106*a*, and a second pump 154*b* can be fluidly coupled between the second fluid source 152*b* and second inlet 106*b*. The pumps 154*a*, 154*b* are operable to convey fluid from their associated fluid sources 152*a*, 152*b* to their associated inlets 106*a*, 106*b*.

The applicator 150 can further comprise a plurality of nozzles 160, wherein each nozzle 160 is fluidly coupled to an associated outlet aperture 56 of the first sub-system 102*a* and an associated outlet aperture 58 of the second sub-system 102*b*. Moreover, a valve 164*a*, 164*b* (e.g., ball valve) can be fluidly coupled between each nozzle 160 and its associated outlet aperture 56, 58 that is operable to selectively control fluid communication therebetween.

The applicator 150 can further comprise a frame 170 that can support the elements described above. In particular, one or more elements (e.g., the manifold units 10*a*, 10*b* and nozzles 160) can be fixed in position to the frame 170 via one or more fastening elements (e.g., screws, brackets, etc.). Alternatively, one or more elements (e.g., the fluid sources 152*a*, 152*b*) can simply rest on the frame 170. The frame 170 can enable its supported elements to be conveyed together by simply moving the frame 170. In some examples, the frame 170 can be a mobile cart with wheels that can be rolled along a surface. In other examples, the frame 170 can be a wand or other handheld device that a user can grasp and move around.

In this manner, the first fluid A of the first fluid source 152*a* can be delivered to the inlet 106*a* of the first sub-system 102*a* and then distributed to the nozzles 160 via the first outlet apertures 56 of the first manifold units 10*a* and the valves 164*a*. Likewise, the second fluid B of the second fluid source 152*b* can be delivered to the inlet 106*b* of the second sub-system 102*b* and then distributed to the nozzles 160 via the second outlet apertures 58 of the second manifold units 10*b* and the valves 164*b*. The first and second fluids A, B can combine and mix within the nozzles 160, which will discharge the mixed fluids as a plurality of separate beads. Moreover, a user can move the frame 170 of the applicator 150 to discharge the beads in a desired pattern along a surface.

The modular configuration of the manifold unit 10 and its inlet and outlet apertures 42, 44, 56, 58 enables both sub-systems 102*a*, 102*b* of the applicator 150 to be assembled differently from each other using the same manifold unit 10. In particular, the sub-systems 102*a*, 102*b* can be assembled and arranged such that their operative outlet apertures 56, 58 are alternately aligned with their outlet axes $Y_1$, $Y_2$ extending along a common horizontal plane. Moreover, for each sub-system 102*a*, 102*b*, the inlet apertures 42, 44 of adjacent manifold units 10*a*, 10*b* can be fluidly coupled by an associated coupling element 104*a*, 104*b* without interference with the manifold units 10*a*, 10*b* of the other sub-system 102*a*, 102*b*. For example, as shown in FIGS. 4 and 5, the coupling elements 104*a* of the first sub-system 102*a* will pass behind the manifold units 10*b* of the second sub-system 102*b*, while the coupling elements 104*b* of the second sub-system 102*b* will pass over the manifold units 10*a* of the first sub-system 102*a*.

Furthermore, because the operative outlet apertures 56, 58 of the manifold system 100 are alternately aligned with their outlet axes $Y_1$, $Y_2$ extending along a common horizontal plane, each nozzle 160 can be fluidly coupled to its associated first and second manifold units 10*a*, 10*b* with relatively short fluid connections that are adjacent to each other along the horizontal plane. Additionally, the valves 164*a*, 164*b* fluidly coupled between the nozzles 160 and manifold units 10*a*, 10*b* can be similarly aligned along a common horizontal plane. Such horizontal alignment of the valves 164*a*, 164*b* can enable an actuation mechanism (not shown) to be easily coupled to all of valves 164*a*, 164*b* so that every valve 164*a*, 164*b* can be commonly operated simultaneously by the actuation mechanism. For example, the actuation mechanism can comprise a handle and one or more linkages that operatively couple the handle to every valve 164*a*, 164*b* so that manipulation of the handle simultaneously adjusts (e.g., opens or closes) the valves 164*a*, 164*b*.

Still further, although the sub-systems 102*a*, 102*b* of the manifold 100 are assembled differently from each other to avoid interference between their manifold units 10*a*, 10*b* and coupling elements 104*a*, 104*b*, the channel configurations of the manifold units 10*a*, 10*b* enable the sub-systems 102*a*, 102*b* to still provide the same flow path distances therethrough. As discussed above, the channels 62, 66, 68 of each manifold unit 10*a*, 10*b* are configured such that the flow paths between each inlet aperture 42, 44 and each outlet aperture 56, 58 are substantially equidistant. Consequently, the flow paths from the inlet 106*a* of the first sub-system 102*a* to its operative outlet apertures 56 will be substantially equidistant to the respective flow paths from the inlet 106*b* of the second sub-system 102*b* to its operative outlet apertures 58. This can enable the outlet apertures 56 of the first sub-system 102*a* and the respective outlet apertures 58 of the second sub-system 102*b* to provide a substantially similar flow rate of fluid, since fluid passing therethrough will travel a similar distance.

Lastly, the modular nature of the manifold unit 10 also enables other configurations of similar manifold systems with more or less manifold units 10 (and operative outlet apertures 56, 58). This can enable a user to customize the manifold system 100 and applicator 150 for different applications having different numbers of nozzles 160 and/or fluid sources 152.

Figure 7:
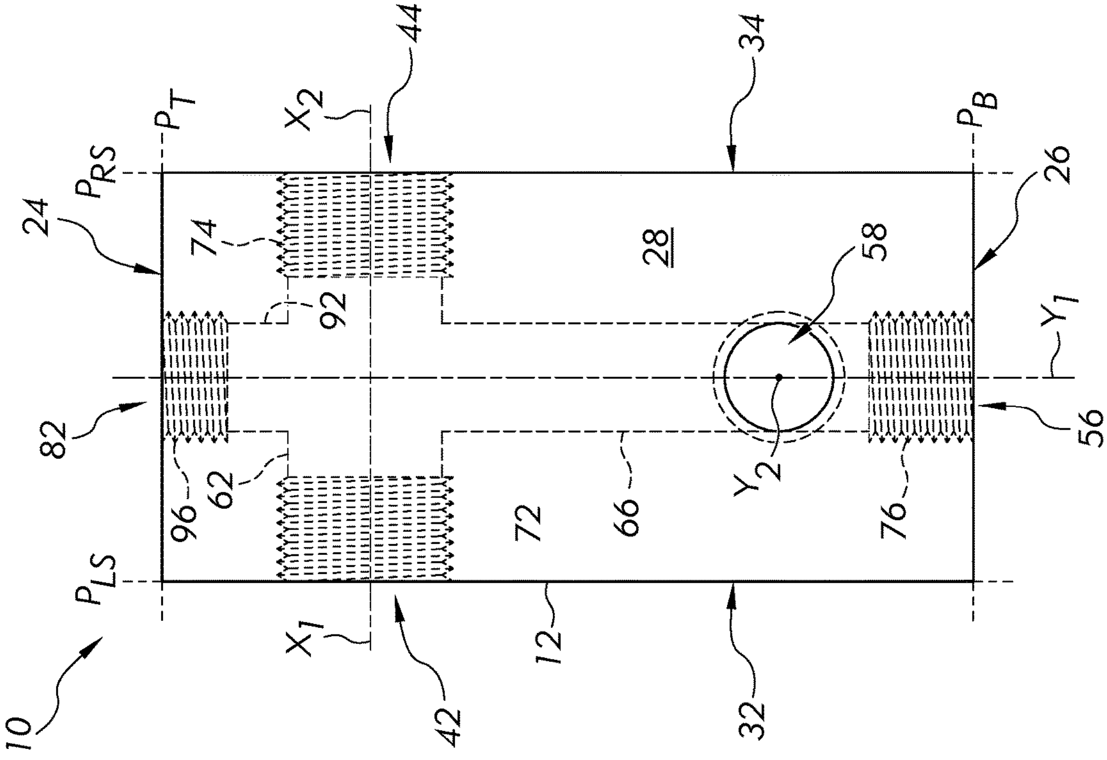
FIG. 7 is a front view of the manifold unit according to a second embodiment.
Figure 8:
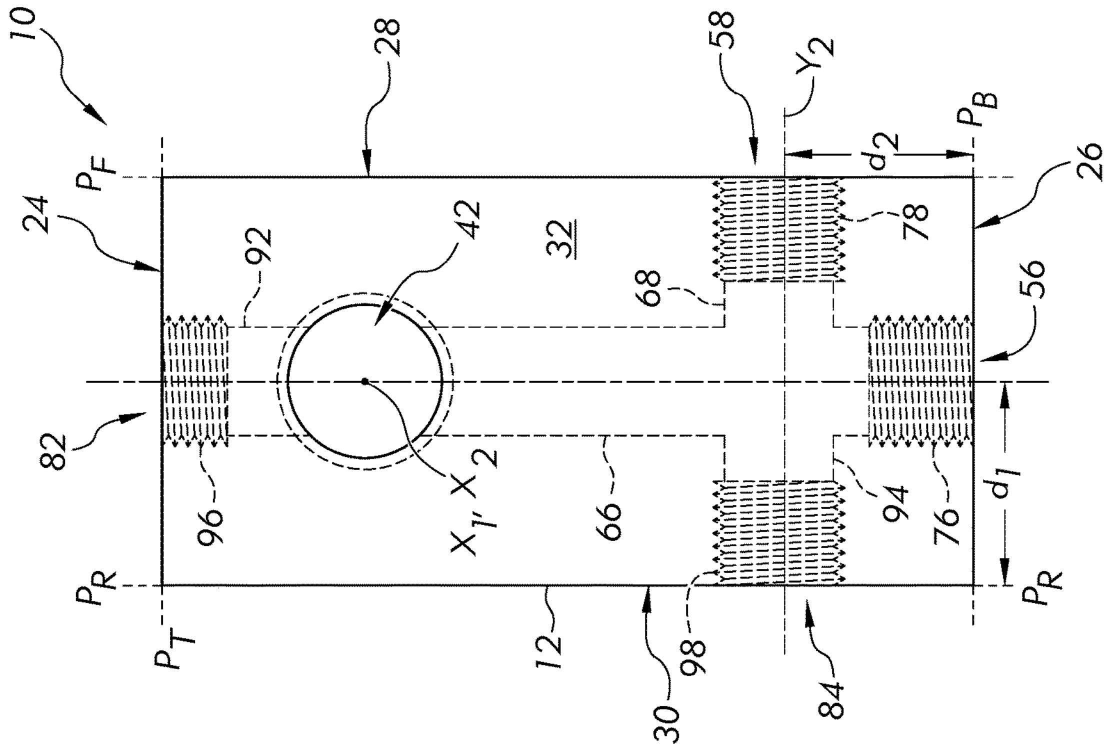
FIG. 8 is a left side view of the manifold unit according to the second embodiment.
Figure 9:
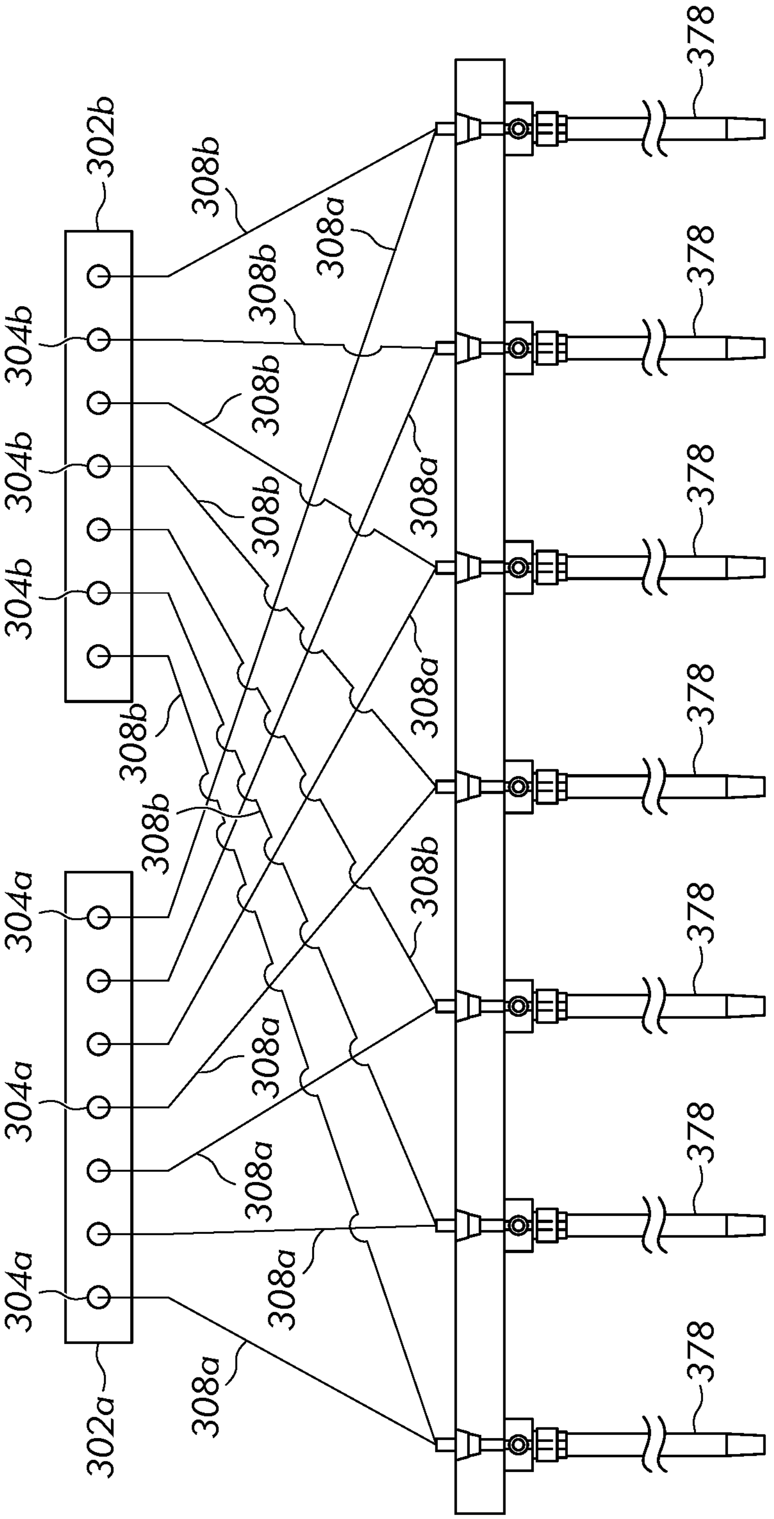
FIG. 9 (PRIOR ART)
FIG. 9 is a schematic view of an example multi-bead applicator of the prior art.

However, it is to be appreciated that the above embodiments are exemplary and various modifications and variations of the manifold unit 10 and manifold system 100 can be made to achieve similar benefits. For example, another embodiment of the manifold unit 10 is shown in FIGS. 7 and 8. The manifold unit 10 in this second embodiment is the same as in the embodiment described above except that it further includes first and second blowout apertures 82, 84 with associated blowout channels 92, 94, wherein each channel 92, 94 has a respective set of threads 96, 98. The first blowout aperture 82 and channel 92 are concentric with the outlet axis $Y_1$, while the second blowout aperture 84 and channel 94 are concentric with the outlet axis $Y_2$.

The manifold unit 10 of the second embodiment can be used for either of the sub-systems 102*a*, 102*b* described above. Moreover, the blowout apertures 82, 84 and channels 92, 94 enable a blowout system to be fluidly coupled to the manifold 10 for the purposes of cleaning out the manifold 10 and sub-system 102*a*, 102*b* after use. For example, the blowout system can include a fluid source (e.g., container) that stores a blowout fluid (e.g., air, cleaning fluid, or an inert gas such as nitrogen), and a supply line (e.g., tubing) for delivering the blowout fluid from the fluid source to the first blowout channel 92. The supply line can have an inlet fluidly coupled to the fluid source, and an outlet fluidly coupled to the first blowout channel 92 (via the threads 96).

The blowout system can further include a fluid conveyor (e.g., pump) that is operable to motivate fluid from the fluid source and into the first blowout channel 92 (via the supply line). The fluid conveyor can be upstream of the fluid source, downstream of the manifold 10, or part of the supply line. In addition or alternatively, the supply line of the blowout system can include a valve (e.g., ball valve) that can be manipulated between open and closed positions. In the open position, compressed fluid (e.g., inert gas) within the fluid source can be permitted to flow through the supply line into the first blowout channel 92, without any need for a fluid conveyor. In the closed position, the compressed fluid will be inhibited from flowing through the supply line into the first blowout channel 92.

Moreover, the blowout system can include a discharge line (e.g., tubing) that can be fluidly coupled to the second blowout channel 94 (via the threads 98) and configured to receive the blowout fluid once it passes through the manifold unit 10. Alternatively, the supply line and discharge line can be coupled in an opposite manner to the second and first blowout channels 94, 92, respectively. Still further, one line (e.g., the supply line) of the blowout system can be fluidly coupled to one of the blowout channels 92, 94, while the other line (e.g., discharge line) of the blowout system can be fluidly coupled to one of the outlet channels 66, 68 (via their associated threads 76, 78).

The manifold unit 10 of the second embodiment thus enables a blowout system to be fluidly coupled to the manifold 10 in a variety of different configurations. Moreover, if one or both of the blowout channels 92, 94 is not being utilized for the blowout system, a plug can be inserted into its associated aperture.

Other modifications of the manifold unit 10 may include other non-cuboid shapes and/or configurations of its internal channels 62, 66, 68. As another example, the first and second outlet axes $Y_1$, $Y_2$ of the manifold unit 10 may be oblique to each other but still reside along a common plane that the manifold 10 can be rotated about achieve different sub-system configurations in which the operative outlets 56, 58 of the subs-systems 102*a*, 102*b* are horizontally aligned. Indeed, it will be apparent to those skilled in the art that various modifications and variations can be made without departing from the spirit and scope of the claimed invention. It is intended to include all such modifications and alterations within the scope of the present invention.

What is claimed is:

1. A manifold unit comprising a body that defines:

a first inlet aperture having a first inlet axis;

a second inlet aperture having a second inlet axis substantially coincident with the first inlet axis;

an inlet channel that extends from the first inlet aperture to the second inlet aperture;

a first outlet aperture having a first outlet axis substantially perpendicular to the first and second inlet axes; and a second outlet aperture having a second outlet axis substantially perpendicular to the first and second inlet axes, wherein the second outlet axis is substantially coplanar with the first outlet axis, wherein a first flow path from the inlet channel to the first outlet aperture has a first distance, and a second flow path from the inlet channel to the second outlet aperture has a second distance substantially equal to the first distance.

2. The manifold unit according to claim 1, wherein the first and second outlet axes are substantially perpendicular to each other.

3. The manifold unit according to claim 1, wherein the body further defines:

a first outlet channel that extends from the inlet channel to the first outlet aperture, and a second outlet channel that extends from the first outlet channel to the second outlet aperture.

4. The manifold unit according to claim 3, wherein:

the inlet channel extends along the first and second inlet axes, the first outlet channel extends along the first outlet axis, and the second outlet channel extends along the second outlet axis.

5. The manifold unit according to claim 3, wherein the inlet channel, first outlet channel, and second outlet channel are at least partially threaded.

6. The manifold unit according to claim 5, wherein:

the inlet channel includes a first set of inlet threads adjacent to the first inlet aperture and a second set of inlet threads adjacent to the second inlet aperture, the first outlet channel has a first set of outlet threads adjacent to the first outlet aperture, and the second outlet channel has a second set of outlet threads adjacent to the second outlet aperture.

7. The manifold unit according to claim 1, wherein the body comprises:

a top surface extending along a top plane, a bottom surface opposite to the top surface that extends along a bottom plane, the bottom surface defining the first outlet aperture, a front surface extending along a front plane, the front surface defining the second outlet aperture, a rear surface opposite to the front surface, the rear surface extending along a rear plane, a left surface extending along a left plane, the left surface defining the first inlet aperture, and a right surface opposite to the left surface that extends along a right plane, the right surface defining the second inlet aperture.

8. A manifold unit comprising a body that comprises:

a top surface extending along a top plane;

a left surface extending along a left plane, the left surface defining a first inlet aperture having a first inlet axis;

a right surface opposite to the left surface that extends along a right plane, the right surface defining a second inlet aperture having a second inlet axis substantially coincident with the first inlet axis;

a bottom surface opposite to the top surface that extends along a bottom plane, the bottom surface defining a first outlet aperture having a first outlet axis substantially perpendicular to the first and second inlet axes;

a front surface extending along a front plane, the front surface defining a second outlet aperture having a second outlet axis substantially perpendicular to the first and second inlet axes, wherein the second outlet axis is substantially coplanar with the first outlet axis; and a rear surface opposite to the front surface, the rear surface extending along a rear plane, wherein a first distance from the rear plane to the first outlet axis is substantially equal to a second distance between the bottom plane and the second outlet axis.

9. The manifold unit according to claim 7, wherein the first outlet aperture and second outlet aperture are substantially centered between the left plane and right plane.

10. A manifold system comprising a plurality of manifold units, wherein each manifold unit comprises a body that defines:

a first inlet aperture having a first inlet axis;

a second inlet aperture having a second inlet axis substantially coincident with the first inlet axis;

a first outlet aperture having a first outlet axis substantially perpendicular to the first and second inlet axes; and a second outlet aperture having a second outlet axis substantially perpendicular to the first and second inlet axes, wherein the second outlet axis is substantially coplanar with the first outlet axis, wherein the plurality of manifold units comprises at least one first manifold unit and at least one second manifold unit arranged such that the first outlet axis of each first manifold unit and the second outlet axis of each second manifold unit are substantially parallel and substantially coplanar.

11. The manifold system according to claim 10, wherein the at least one first manifold unit comprises a plurality of first manifold units fluidly coupled together, and the at least one second manifold unit comprises a plurality of second manifold units fluidly coupled together.

12. The manifold system according to claim 10, wherein the body of each manifold unit comprises:

a top surface extending along a top plane, a bottom surface opposite to the top surface that extends along a bottom plane, the bottom surface defining the first outlet aperture, a front surface extending along a front plane, the front surface defining the second outlet aperture, a rear surface opposite to the front surface, the rear surface extending along a rear plane, a left surface extending along a left plane, the left surface defining the first inlet aperture, and a right surface opposite to the left surface that extends along a right plane, the right surface defining the second inlet aperture.

13. The manifold system according to claim 12, wherein the bottom surface of each first manifold unit and the front surface of each second manifold unit are substantially coplanar.

14. A multi-bead applicator comprising:

the manifold system according to claim 11; and a plurality of nozzles, wherein each nozzle is fluidly coupled to:

the first outlet aperture of an associated first manifold unit, such that fluid can be delivered from the first manifold unit to the nozzle via the first outlet aperture, and the second outlet aperture of an associated second manifold unit, such that fluid can be delivered from the second manifold unit to the nozzle via the second outlet aperture.

15. The multi-bead applicator according to claim 14, further comprising:

a first fluid source containing a first fluid, wherein the first fluid source is fluidly coupled to the plurality of first manifold units such that the first fluid can be delivered from the first fluid source to each first manifold unit via the first inlet aperture or second inlet aperture of the first manifold unit, and a second fluid source containing a second fluid, wherein the second fluid source is fluidly coupled to the plurality of second manifold units such that the second fluid can be delivered from the second fluid source to each second manifold unit via the second inlet aperture or second inlet aperture of the second manifold unit.

* * * * *